United States Patent [19]

Loutsch et al.

[11] Patent Number: 5,076,737
[45] Date of Patent: Dec. 31, 1991

[54] DEVICE FOR SHUTTING OF PIPELINE FOR THE TRANSPORT OF BULK PRODUCT

[75] Inventors: Jeannot Loutsch; Pierre Mailliet; Leon Ulveling, all of Howald; Emile Lonardi, Bascharage; Louis Schmit, Eberhardt, all of Luxembourg

[73] Assignee: Paul Wirth S.A., Luxembourg

[21] Appl. No.: 486,614

[22] Filed: Feb. 27, 1990

[30] Foreign Application Priority Data

Mar. 17, 1989 [LU] Luxembourg ............................. 87482

[51] Int. Cl.⁵ ............................................. B65G 53/40
[52] U.S. Cl. ..................................... 406/183; 406/192
[58] Field of Search ............................. 406/182, 192; 251/84-88, 160-163, 172, 304, 314, 315

[56] References Cited

U.S. PATENT DOCUMENTS

| 2,598,207 | 5/1952 | Bailey et al. | 406/192 |
| 2,910,266 | 10/1959 | Condello et al. | |
| 3,599,832 | 8/1971 | Smith | 406/192 |
| 4,872,785 | 10/1989 | Schrage et al. | 406/192 |

FOREIGN PATENT DOCUMENTS

| 0685899 | 1/1967 | Belgium . | |
| 3811537 | 11/1988 | Fed. Rep. of Germany | 406/192 |
| 1559238 | 3/1969 | France | 406/183 |
| 0346216 | 12/1989 | France . | |
| 1416403 | 8/1988 | U.S.S.R. | 406/192 |

Primary Examiner—Jesus D. Sotelo
Assistant Examiner—Stephen P. Avila
Attorney, Agent, or Firm—Fishman, Dionne & Cantor

[57] ABSTRACT

A device for shutting off pipelines for the transport of bulk product is disclosed. The device comprises a housing with a circular passage orifice, a closing element mounted pivotably in the housing, and an annular gasket surrounding the said orifice and capable of interacting with the peripheral part of the closing element. The gasket is mounted on a fixed support, and the closing element is displaceable along an axis perpendicular relative to its pivot axis. The device is particularly adapted for pipelines for transport of coal dust.

7 Claims, 5 Drawing Sheets

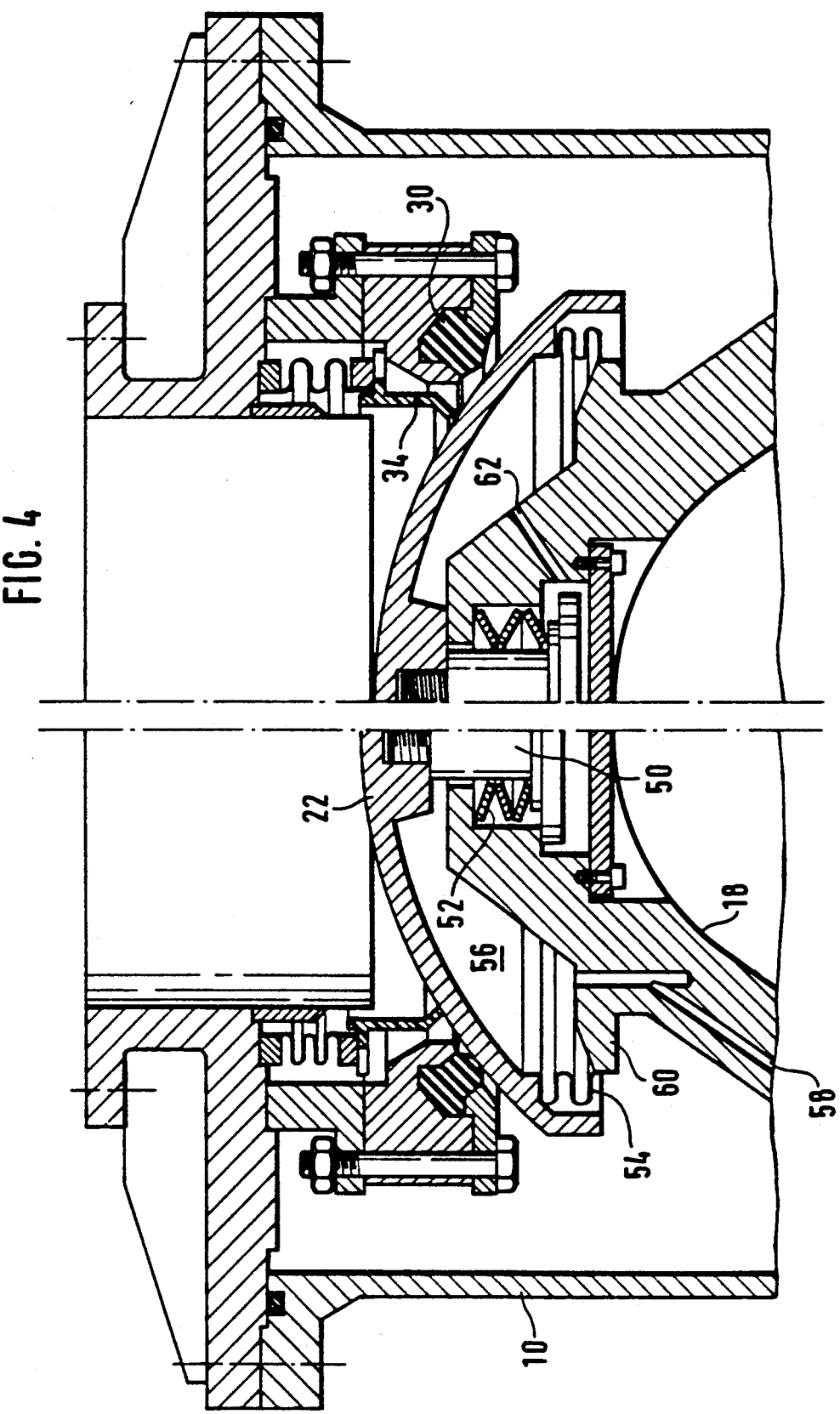

DEVICE FOR SHUTTING OF PIPELINE FOR THE TRANSPORT OF BULK PRODUCT

TECHNICAL FIELD

The present invention relates to a device for shutting off pipelines for the transport of bulk products.

BACKGROUND OF THE INVENTION

The document DE-A1-3,544,609 proposes a shutoff device, the gasket of which is mounted on an annular support axially displaceable towards the closing element under the action of pneumatic fluid. In a shutoff device of this type, when the closing member is being actuated the friction of the latter on the gasket must be avoided as far as possible, in order to prevent a rapid wear of the gasket. The gasket support is therefore designed in the form of an annular pneumatic jack which is delimited radially by an internal concertina compensator and an external concertina compensator. The gasket is laid onto the closing element by putting the pneumatic jack under pressure, the displacement of the gasket being allowed by the expansion of the corrugations of the two compensators. For displacement in the opposite direction the pneumatic jack is ventilated, and the natural elasticity of the corrugations of the compensator is utilized in order to lift the gasket from the closing element. Now because spring functions are assigned to the compensator, this not being its primary purpose, it is necessary to take into account that, in contrast to a spring, a compensator cannot be pre-stressed, and therefore a certain number of corrugations is required to ensure the desired displacement, thereby increasing the height of the annular pneumatic jack.

These devices, which are used particularly in systems for the pneumatic transport of, for example, coal dust, must be capable of containing the pressure both upstream and downstream of the closing element. In the known device, the surface of the gasket support which is exposed to the pressure in the housing corresponds substantially to the annular surface undergoing the action of the pneumatic fluid, particularly where the wear of the gaskets is concerned. To make it possible to ensure effective closing against the pressure inside the housing, the pressure of the pneumatic fluid must be substantially higher than the pressure of the pneumatic transport system, the more so because the pulling force of the compensator, occurring in the opposite direction, has to be overcome. In other words, the known device does not make it possible to use the main pressurizing station of the transport system in order to actuate the pneumatic jack, this being because a higher pressure is needed. It is therefore necessary to have separate compressor in order to actuate the pneumatic jack.

SUMMARY OF THE INVENTION

The object of the present invention is to provide an improved shutoff device which does not have the disadvantages described above. To achieve this object, the present invention provides a shutoff device wherein the gasket is mounted on a fixed support, and wherein the closing element is displaceable along an axis perpendicular relative to its pivot axis.

The closing element comprises a spherical dome carried by a piston sliding axially in a support which pivots about the transverse axis of the housing. A sealing closure is provided between the edge of this dome and the support so as to define a first sealed chamber between the dome and the support, this chamber being connected via the support to a pneumatic fluid source, the pressure of which lifts the dome from its support.

According to a first embodiment, a spring is provided round the said piston, and the action of this spring is opposed to that of the pneumatic fluid.

The sealing between the edge of the dome and the support can be obtained by means of cylindrical compensator.

According to another embodiment, the support has a head with a spherical surface which extends underneath the said spherical dome and the peripheral edge of which is in frictional contact, by means of a gasket, with the inner surface of an outer cylindrical skirt forming part of the peripheral edge of the spherical dome.

An annular element fastened by means of its outer edge to the cylindrical skirt extends underneath the head of the support, and the inner edge of the head is connected to the support by means of a compensator defining, with the lower surface of the head of the support, a second sealed chamber connected via the support to a pneumatic fluid source, the pressure of which maintains the dome on the support. The two pneumatic chambers can be connected to the same pneumatic fluid source via a switching valve.

The device also possesses a cylindrical scraper arranged coaxially inside the gasket and axially displaceable by means of a elastic fastening.

BRIEF DESCRIPTION OF THE DRAWING

Other particular features and characteristics will emerge from the detailed description of several advantageous embodiments given below by way of illustration, with reference to the accompanying drawings in which:

FIG. 4 shows diagrammatically an axial section through a first embodiment;

DETAILED DESCRIPTION OF THE DRAWINGS

Figure 1:
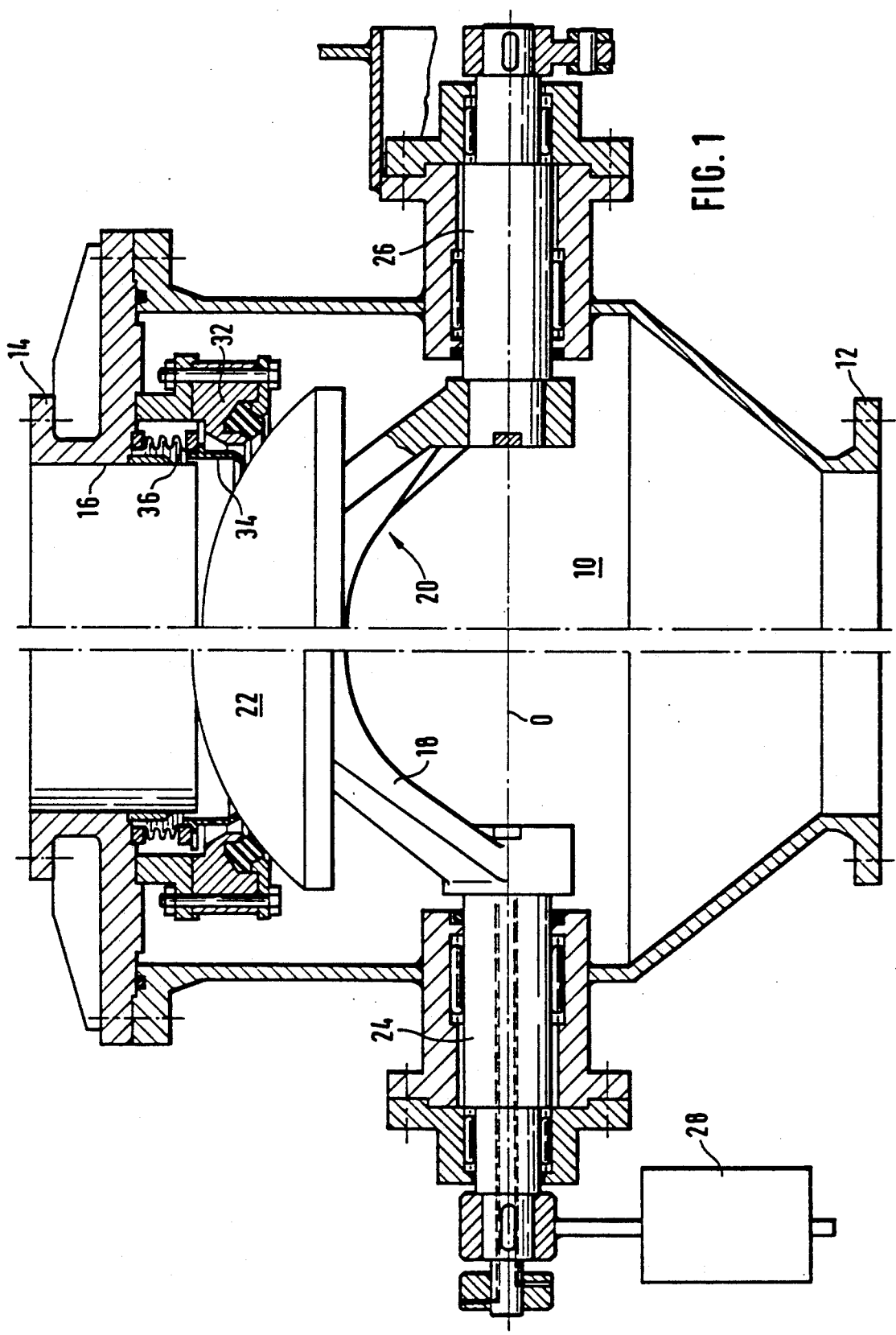
FIG. 1 shows a general diagrammatic view in axial section of a shutoff device according to the present invention.

The device illustrated in FIG. 1 comprises a housing 10 equipped with mutually opposite flanges 12, 14 so as to be connected to a flow-off pipeline for bulk products, such as, for example, coal dust. The upper part of the housing 10 is designed in the form of a pipe connection 16, intended to be closed or opened by means of a closing element 20. This closing element 20 comprises a spherical dome 22 mounted on the pivoting support 18 carried by two shafts 24, 26 which are seated and supported in mutually opposite bearings of the housing 10, in order to allow the closing element 20 to pivot about its horizontal axis 0 between the closed position according to FIG. 1 and an opening position offset at 90°. One of the shafts of the support, for example the shaft 26, is subjected, on the outside of the housing 10, to a drive mechanism in order to pivot the closing element 20, whilst the other shaft 24 carries, on the outside of the housing 10, a weight 28 which is heavier than the weight of the closing element 22, to ensure that the latter assumes a stable state in the closed position, if the drive means break down.

In the closed position, the sealing of the closing element 20 is obtained by means of an annular gasket 30 seated in a support 32 fastened to the housing 10, the support 32 being designed to allow the gasket 30 to be removed quickly and easily To ensure sealing and at the same time allow the dome 22 to pivot, the latter is axially displaceable in relation to its support 18. Although it is the same dome 22 which is shown on the left and on the right of the vertical axis in FIG. 1, for the sake of illustration the left part has been show in the raised position laid sealingly against the gasket 30, while the part on the right has been shown in the lowered position away from the gasket 30, to allow the dome 22 to pivot about the horizontal axis 0.

A cylindrical scraper 34 is preferably mounted axially inside the gasket 30. This scraper 34 is supported by the housing 10 by elastic means which, in the example illustrated, are a compensator 36 and which return the scraper 34 elastically up against the surface of the dome 22. This measure is intended for protecting the gasket 30 against crusts of material which remain attached to the dome 22 and which are detached by the scraper 34 during the movement of the dome 22.

Figure 3:
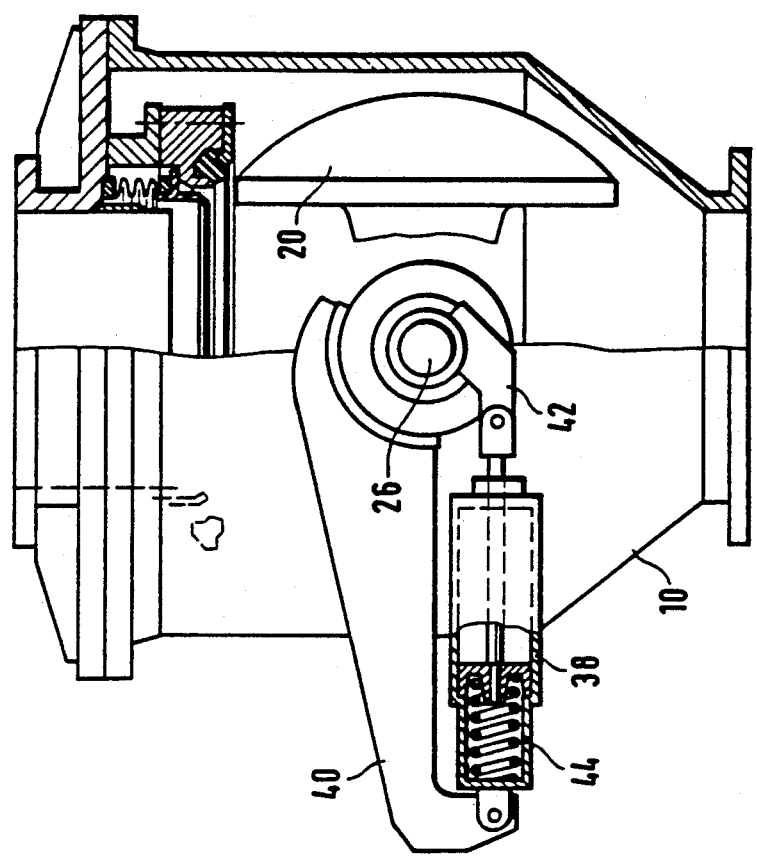
FIGS. 2 and 3 each show a partially sectional diagrammatic side view illustrating the closing element in the closed position and in the open position respectively.
Figure 2:
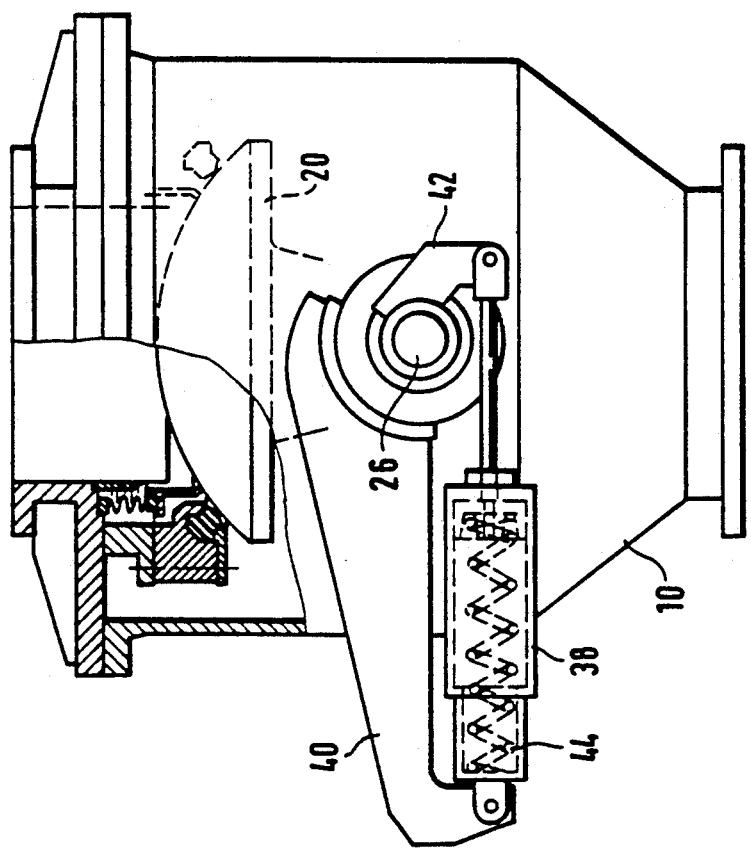

FIGS. 2 and 3 illustrate diagrammatically the mechanism for actuating the shutoff device 20. This mechanism comprises a jack 38 or other drive means which is mounted between a bracket 40 fixed to the housing 10 and an arm 42 fastened to the shaft 26. As emerges from the figures, the closing of the shutoff device 20, that is to say the pivoting of the shutoff device 20 forms a position of FIG. 3 towards the position of FIG. 2, is obtained by extending the piston rod from the cylinder of the jack 38, opening being obtained by means of the reverse operation.

As shown in FIGS. 2 and 3, a helical spring 44 is provided inside the jack 38, and the action of this spring 44 contributes to closing the shutoff device 20 and opposes its opening. This spring 44 is provided in association with or as a replacement of the weight 28 of FIG. 1, and its power, if appropriate associated with that of the weight 28, is sufficient for closing the shutoff device in the event of the failure of the jack 38.

FIG. 4 shows a first embodiment for lifting the spherical dome 22 and laying it sealingly against the seat 30, the left part of the Figure showing the dome in the lifted position, while the right part shows the dome in the lowered position. This dome 22 is carried by a piston 50 which is axially mounted slidably at the center of this support 18. This piston 50 is associated with a spring 52, for example a helical spring or a spring of the BELLEVILLE type, the action of which maintains the dome 22 in the position illustrated in the right-hand part of the figure. The peripheral part of the dome 22 is connected sealingly to the support 18 by means of a compensator 54 which allows an axial displacement of the dome 22. Instead of the compensator 54, it is also possible to provide a gasket, because the space defined between the dome 22 and the support 18 is in the form of a pneumatic chamber 56 which is connected by means of a duct 58 to a pneumatic fluid source via the support 18. The pressurization of this chamber 56 lifts the dome 22 counter to the action of the spring 32 into the position illustrated on the left of FIG. 4. In order to relieve the gasket 30, this movement is preferably limited by a shoulder 60 which forms a stop with the support 18.

For opening purposes, the dome 22 has to be removed from the gasket 30, and for this purpose it is sufficient to ventilate the chamber 56 in order to allow the spring 52 to lay the dome 22 onto its seat. To prevent a pumping effect in the space round the piston 50, this space is preferably connected to the chamber 56 by means of a duct 62 in the support 18.

Figure 5:
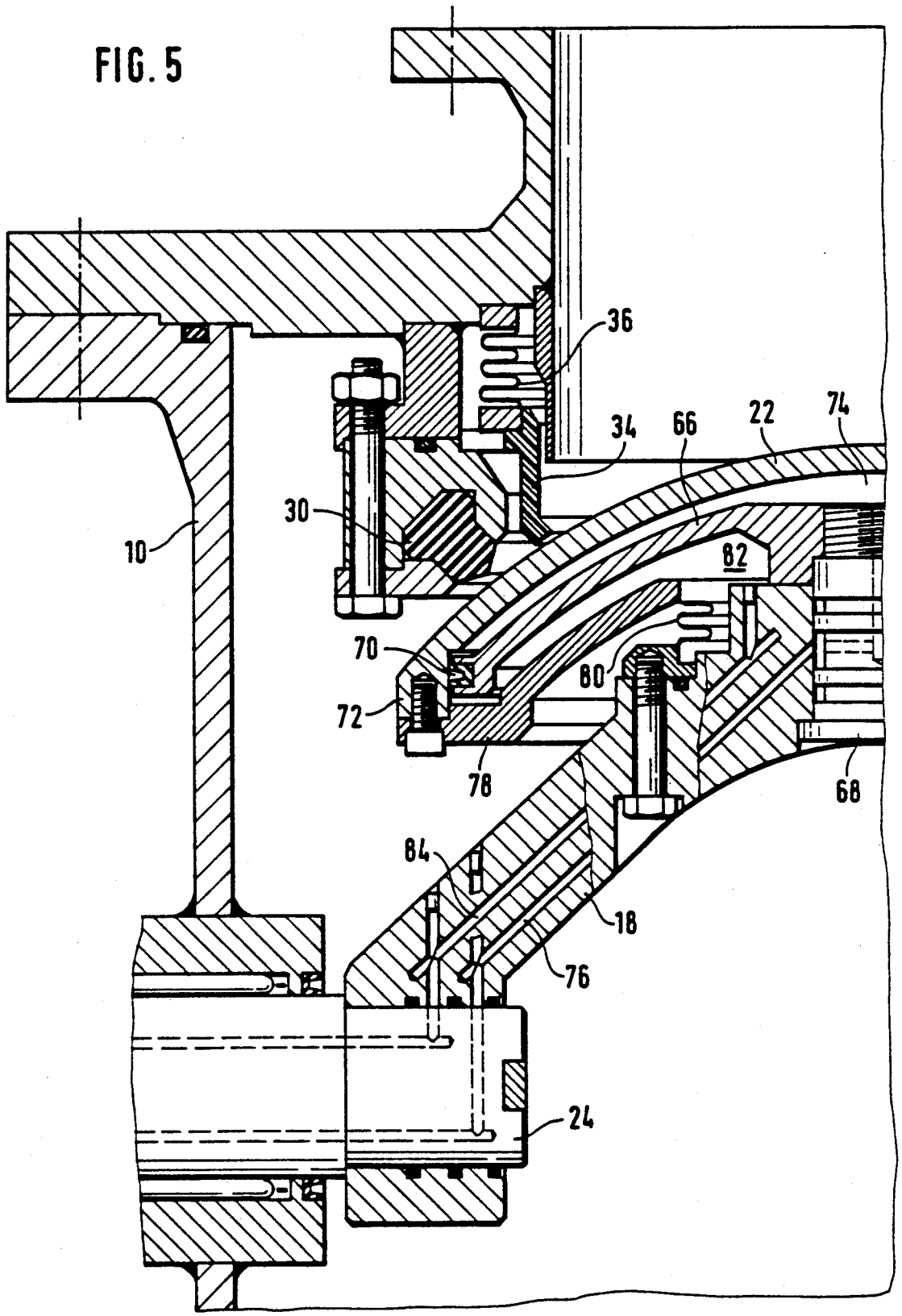
FIGS. 5 and 6 show diagrammatically partial axial sections through a second embodiment, respectively illustrating the dome in two different axial positions.
Figure 6:
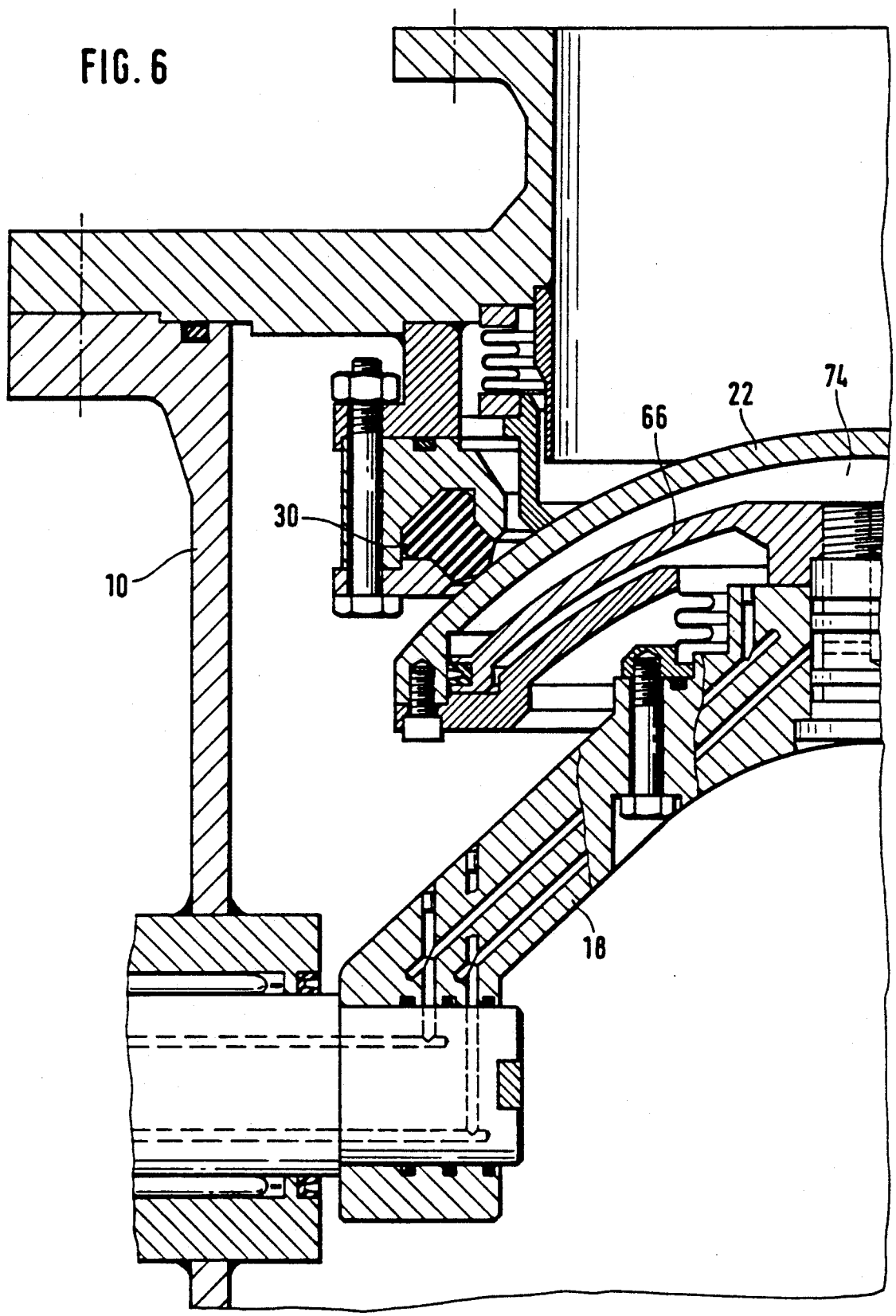

FIGS. 5 and 6 illustrate a second embodiment for lifting the dome 22 from its support 18 and laying it sealingly against the annular gasket 30. In this embodiment, a piston 66 with a spherical surface is fastened removably to the support 18 by means of a threaded sleeve 68. This spherical piston 66 extends underneath the spherical dome 22. The space formed between the dome 22 and the piston 66 constitutes a first chamber 74, the sealing of which is ensured by mean of the gasket 70 which nevertheless allows an axial displacement of the dome 22 in relation to the piston 66, without the sealing being disturbed. This chamber 74 is connected by mean of a duct 76 via the shaft 24, the support 18 and the threaded sleeve 68, so that the pressurization of the chamber 74 by means of a pneumatic fluid lifts the dome 22 from its support 18 in order to lay it against the gasket 30, as shown in FIG. 6.

An annular element 78, likewise with a spherical surface, is screwed to the edge of the skirt 72 of the dome 22. This annular element 78 extends underneath the spherical piston 66, and its inner edge is connected to the support 18 by means of a cylindrical compensator 80, so as to define a second chamber 82 between the element 78 and the spherical piston 66, the sealing of this chamber being ensured by the gasket 70 and the compensator 80. This second pneumatic chamber 82 is connected to a pneumatic fluid source by means of a duct 84 likewise extending through the support 18 and the shaft 24. The pressurization of this chamber 82 exerts a vertical force on the annular element 78, tending to maintain the dome of the support 28, according to FIG. 5, provided that the first pneumatic chamber 74 is ventilated. For this purpose, it is preferable to connect the two chambers 74 and 82 to the same pneumatic fluid source, so that one of the two chambers is automatically ventilated while the other is being put under pressure.

The outer edges of the piston 66 form stops for limiting the movement of the dome 22, in interaction either with the edge of the dome 22 when chamber 82 is under pressure, as shown in FIG. 5, or with the annular element 78 when the chamber 74 is put under pressure, as shown in FIG. 6. The pressure prevailing inside the housing exerts on the movable part, that is to say the dome 22 and its lower extension formed by the annular element 78, a pressure of which the maximum effect can correspond to a force exerted on a surface of an effective radius corresponding to the mean radius of the compensator 80, this being because beyond this radius the forces on the annular element 78 and the corresponding parts of the dome 22 compensate one another. In contrast, the forces resulting from the pneumatic pressures in the chamber 74 and 82 exert their effect on a substantially larger surface, so that the pressure of the pneumatic fluid does not have to be higher than the pressure prevailing in the housing 10.

While preferred embodiments have been shown and described, various modifications and substitutions may be made thereto without departing from the spirit and scope of the invention has been described by way of illustrations and not limitations.

What is claimed is:

1. A device for shutting off a pipeline for the transport of bulk products, comprising:
    a housing having a circular orifice;
    an annular gasket surrounding said orifice;
    closing means for closing said orifice, said closing means being pivotable about a first axis within said housing, having a closed position wherein the closing means contacts the gasket to close said orifice, having a second position wherein the closing means is axially displaced from the gasket and having an open position in which the closing means is pivotably displaced about the first axis from the second position;
    means for axially displacing the closing means in a direction perpendicular to the first axis; and
    means for pivoting the closing means about the first axis; wherein;
    the closing means comprises a spherical dome;
    the means for pivoting comprises a support pivotably mounted within the housing, said dome being slidably mounted on said support to define a first sealed chamber between the dome and the support; and
    the means for axially displacing the closing element comprises pneumatic fluid supply means for pressurizing the first sealed chamber to urge the dome axially away from the support.

2. A device according to claim 1 further comprising:
    a piston secured to the dome and slidably received by the support; and
    resilient means for urging the piston and dome toward the support.

3. A device according the claim 2, wherein the dome comprises a circumferential edge and further comprising compensator means for sealingly connecting the circumferential edge of the dome to the support.

4. A device according to claim 1, wherein the dome further comprises a first circumferential edge and a circumferential skirt extending from said first circumferential edge, said skirt including an inner surface and wherein the means for axially displacing comprises a piston, said piston comprising a spherical upper surface extending beneath the dome and having a second circumferential edge; and gasket means surrounding the second circumferential edge for sealingly contacting the inner surface of the circumferential skirt.

5. A device according to claim 4, further comprising an annular element extending beneath said piston from an outer edge, said outer edge being secured to said skirt, to an inner edge;
    and compensator means for connecting said inner edge to said support to define a second sealed chamber between the piston and the annular element and wherein said pneumatic means further comprises means for pressurizing the second sealed chamber.

6. A device according to claim 5, further comprising switching valve means for connecting said first and second sealed chambers to said pneumatic fluid supply means.

7. A device according to claim 1, further comprising cylindrical scraper means surrounding said orifice for contacting said dome; and resilient means for securing said scraper means to the housing and allowing axial movement of said scraper means relative to said housing.

* * * * *

UNITED STATES PATENT AND TRADEMARK OFFICE
CERTIFICATE OF CORRECTION

PATENT NO. : 5,076,737

DATED : Dec. 31, 1991

INVENTOR(S) : Jeannot Loutsch et al.

It is certified that error appears in the above-identified patent and that said Letters Patent is hereby corrected as shown below:

On the title page and col. 1, lines 1-2:

Title       Delete "OF PIPELINE" and insert therefore -- OFF PIPELINES --.

Column 2, Line 29 Delete "a" and insert therefore -- an --.
Column 3, Line 9 Insert--.--between "easily" and "To".
Column 3, Line 14 Delete "show" and insert therefore -- shown --.
Column 4, Line 21 Delete "mean" and insert therefore -- means --.
Column 5, Line 1 After "invention", insert--. Accordingly, it is to be understood that the present invention --.
Column 6, Line 1 Delete the first occurrence of "the" and insert therefore -- to --.

Signed and Sealed this

First Day of June, 1993

Attest:

MICHAEL K. KIRK

Attesting Officer      Acting Commissioner of Patents and Trademarks